(12) United States Patent
Kiyama et al.

(10) Patent No.: US 11,117,554 B2
(45) Date of Patent: Sep. 14, 2021

(54) VEHICLE WIPER-WASHER DEVICE

(71) Applicant: DENSO CORPORATION, Kariya (JP)

(72) Inventors: Masaaki Kiyama, Hamamatsu (JP); Yasuhiro Harita, Kosai (JP); Takayuki Imamura, Hamamatsu (JP)

(73) Assignee: DENSO CORPORATION, Kariya (JP)

( * ) Notice: Subject to any disclaimer, the term of this patent is extended or adjusted under 35 U.S.C. 154(b) by 368 days.

(21) Appl. No.: 16/318,241

(22) PCT Filed: Jul. 10, 2017

(86) PCT No.: PCT/JP2017/025182
§ 371 (c)(1),
(2) Date: Jan. 16, 2019

(87) PCT Pub. No.: WO2018/016373
PCT Pub. Date: Jan. 25, 2018

(65) Prior Publication Data
US 2019/0168718 A1 Jun. 6, 2019

(30) Foreign Application Priority Data
Jul. 20, 2016 (JP) .............................. JP2016-142307

(51) Int. Cl.
*B60S 1/46* (2006.01)
*B60S 1/52* (2006.01)
(Continued)

(52) U.S. Cl.
CPC ................. *B60S 1/524* (2013.01); *B60S 1/08* (2013.01); *B60S 1/46* (2013.01); *B60S 1/485* (2013.01); *B60S 1/52* (2013.01)

(58) Field of Classification Search
CPC ...... B60S 1/08; B60S 1/52; B60S 1/48; B60S 1/46
See application file for complete search history.

(56) References Cited

U.S. PATENT DOCUMENTS

| 9,067,567 B2 * | 6/2015 | Matsumoto ............. B60S 1/522 |
| 10,259,430 B2 * | 4/2019 | Tousignant ............. B60S 1/486 |
| 10,328,905 B2 * | 6/2019 | Tousignant ............. B60S 1/482 |

FOREIGN PATENT DOCUMENTS

| DE | 10 2013 003 729 A1 | 4/2014 |
| EP | 3006280 A * | 4/2016 |

(Continued)

OTHER PUBLICATIONS

May 19, 2020 Japanese Office Action issued in Japanese Patent Application No. 2016-142307.

*Primary Examiner* — Michael D Jennings
(74) *Attorney, Agent, or Firm* — Oliff PLC

(57) ABSTRACT

The present disclosure provides a vehicle wiper-washer device including: a wiper motor causing to-and-fro wiping operation on a wiping surface by a wiper blade coupled to a wiper arm; a washer pump that feeds washer fluid under pressure to a jetting portion provided to at least one of the wiper blade or the wiper arm, to cause washer fluid to be jetted from the jetting portion toward the wiping surface on an outward movement direction side of the wiper blade during the to-and-fro wiping operation; and a control unit that, when a predetermined signal is detected, controls the wiper motor and the washer pump such that the to-and-fro wiping operation is performed, and such that washer fluid is jetted from the jetting portion toward the wiping surface on the outward movement direction side while a return path wiping operation of the to-and-fro wiping operation is being performed.

7 Claims, 9 Drawing Sheets

(51) Int. Cl.
  *B60S 1/08*     (2006.01)
  *B60S 1/48*     (2006.01)

(56) References Cited

FOREIGN PATENT DOCUMENTS

| | | |
|---|---|---|
| JP | S52-105227 U | 8/1977 |
| JP | 2005-145138 A | 6/2005 |
| JP | 2007-055562 A | 3/2007 |
| JP | 2015-131616 A | 7/2015 |
| JP | 2015-217842 A | 12/2015 |

* cited by examiner

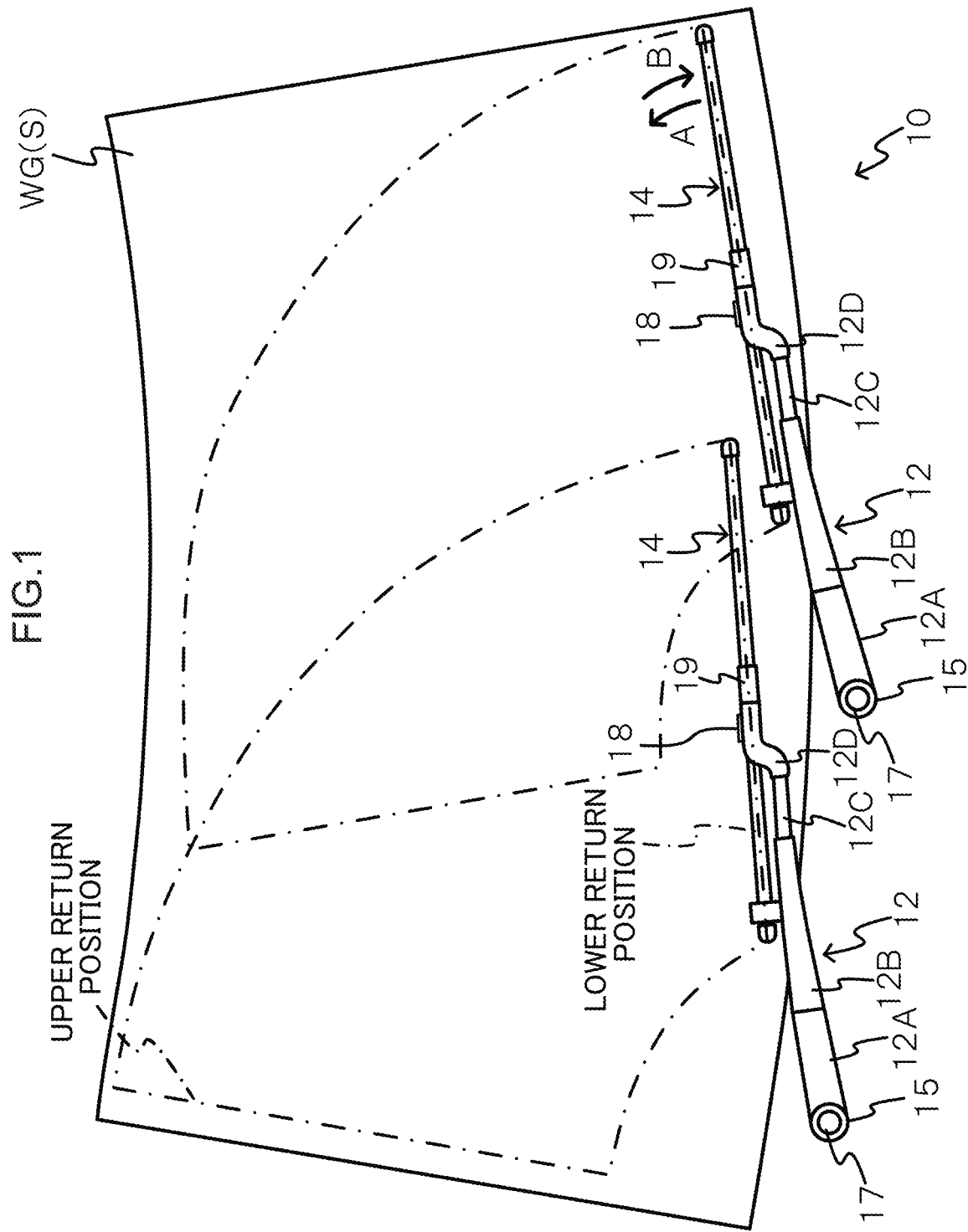

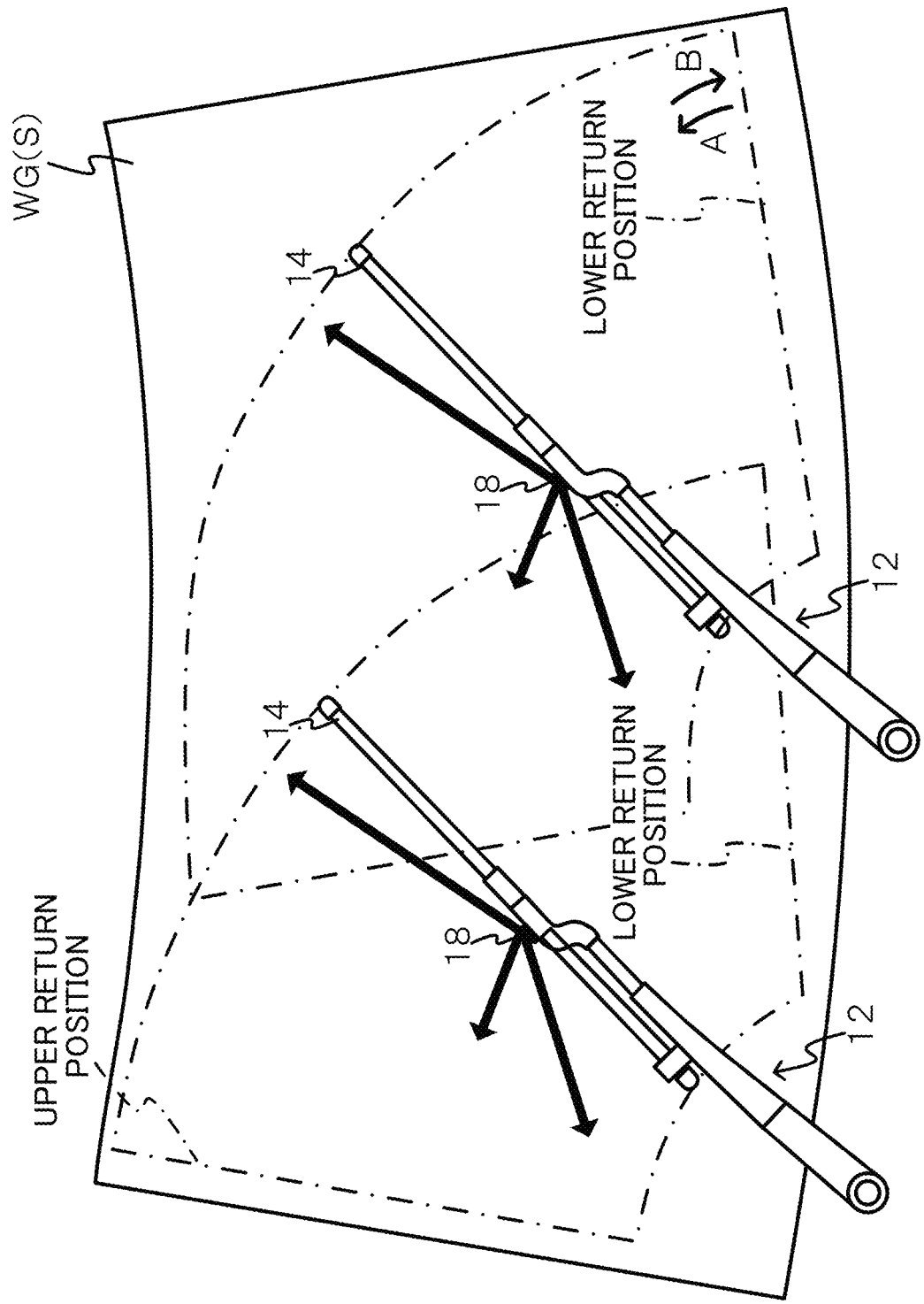

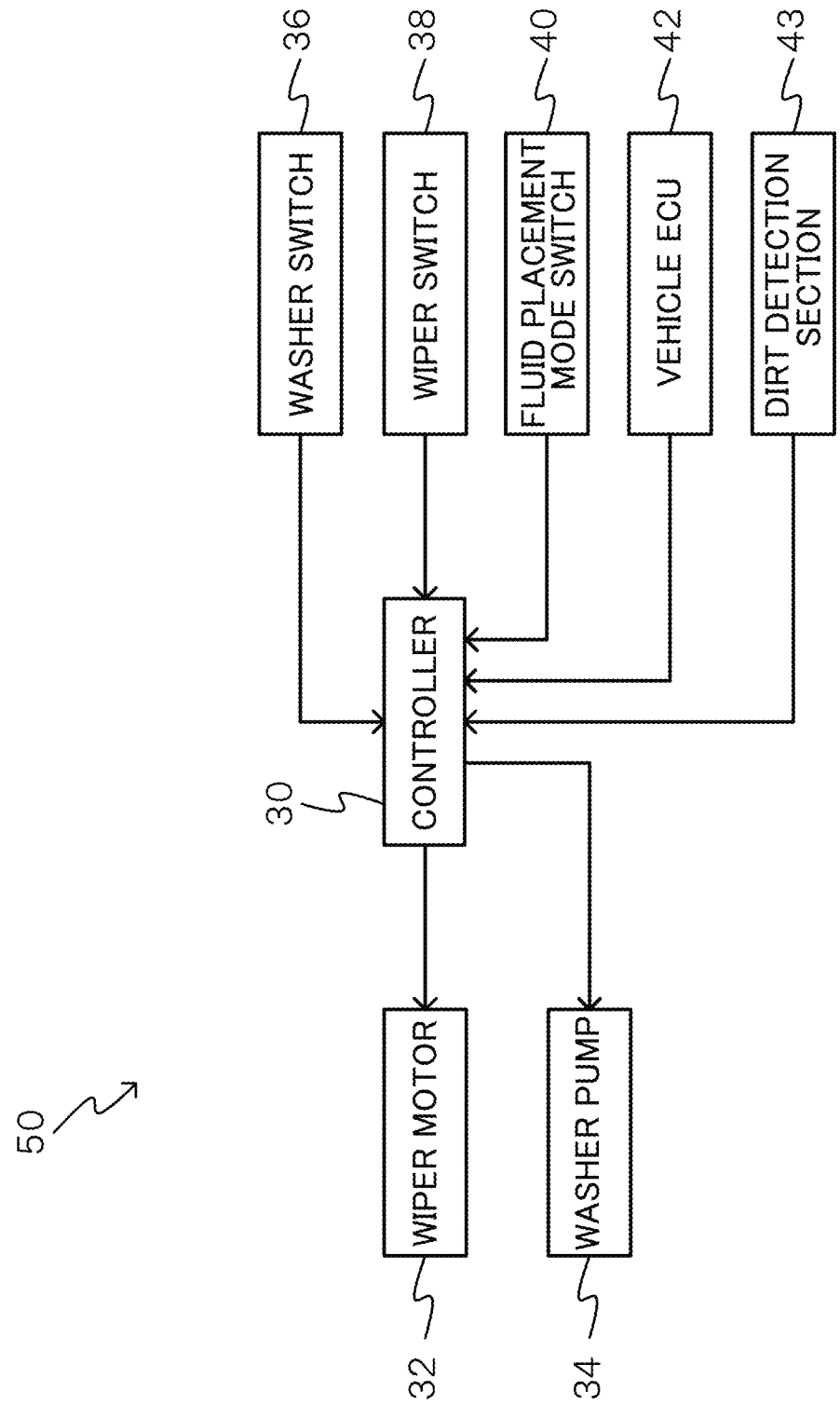

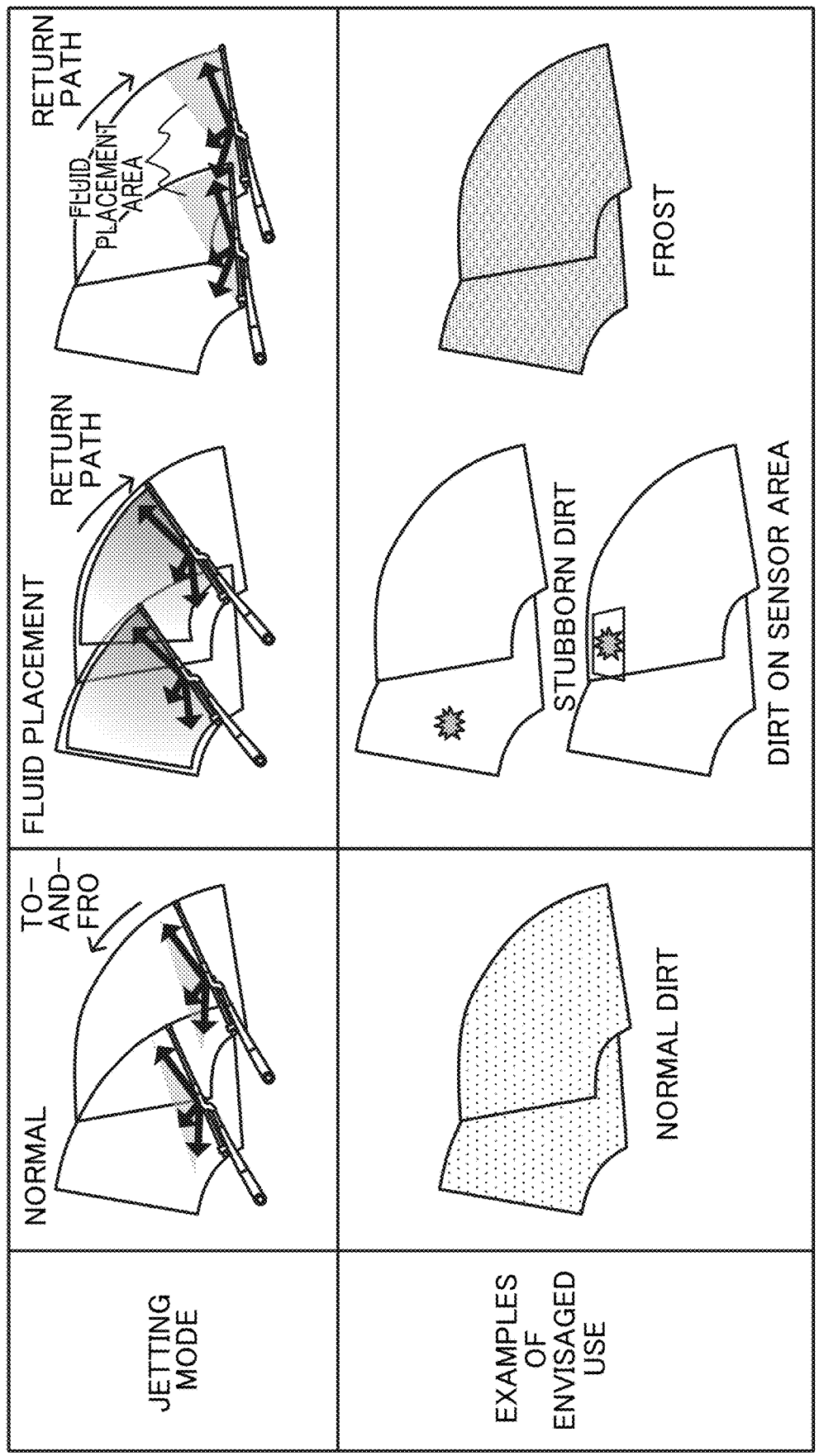

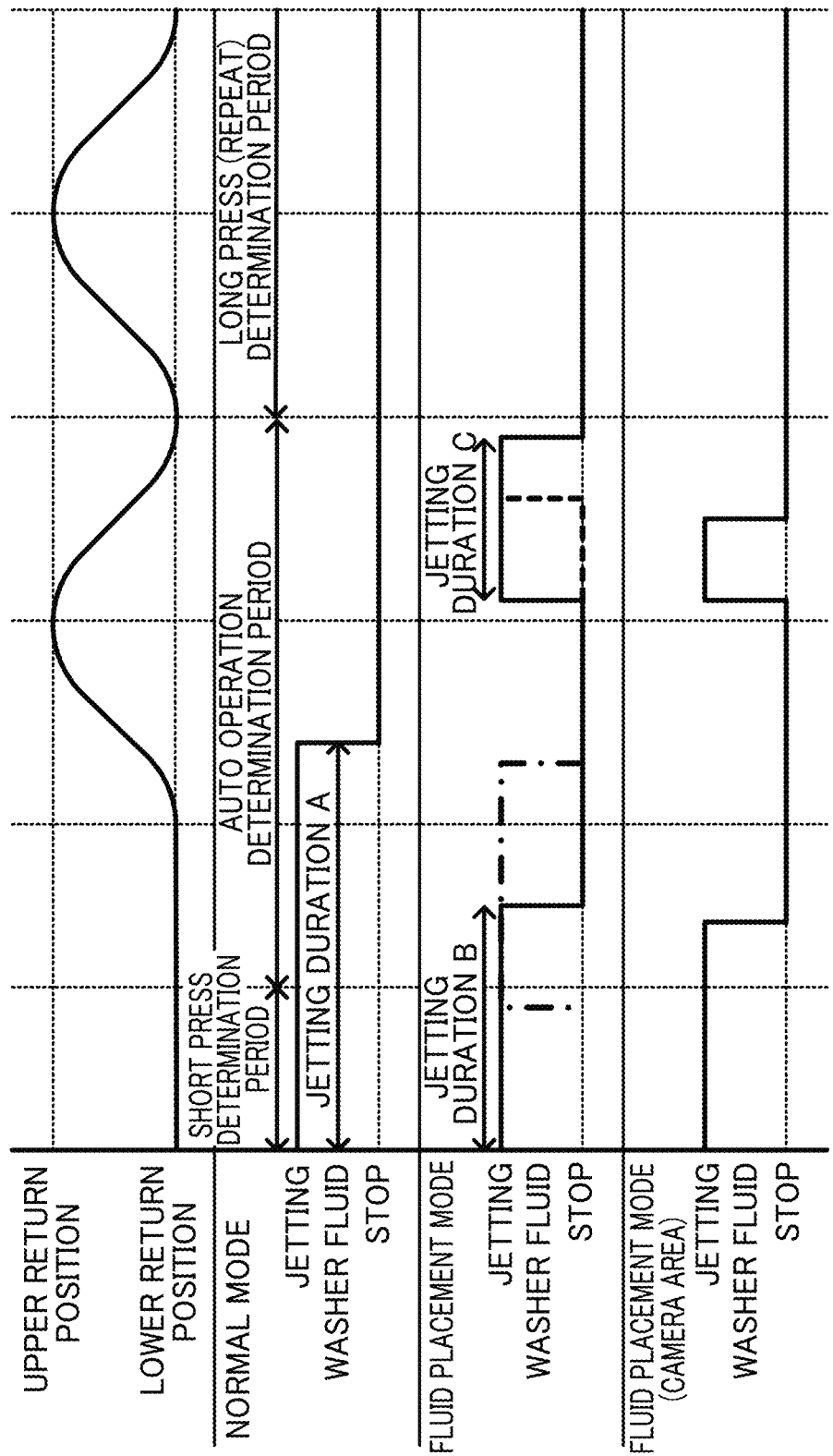

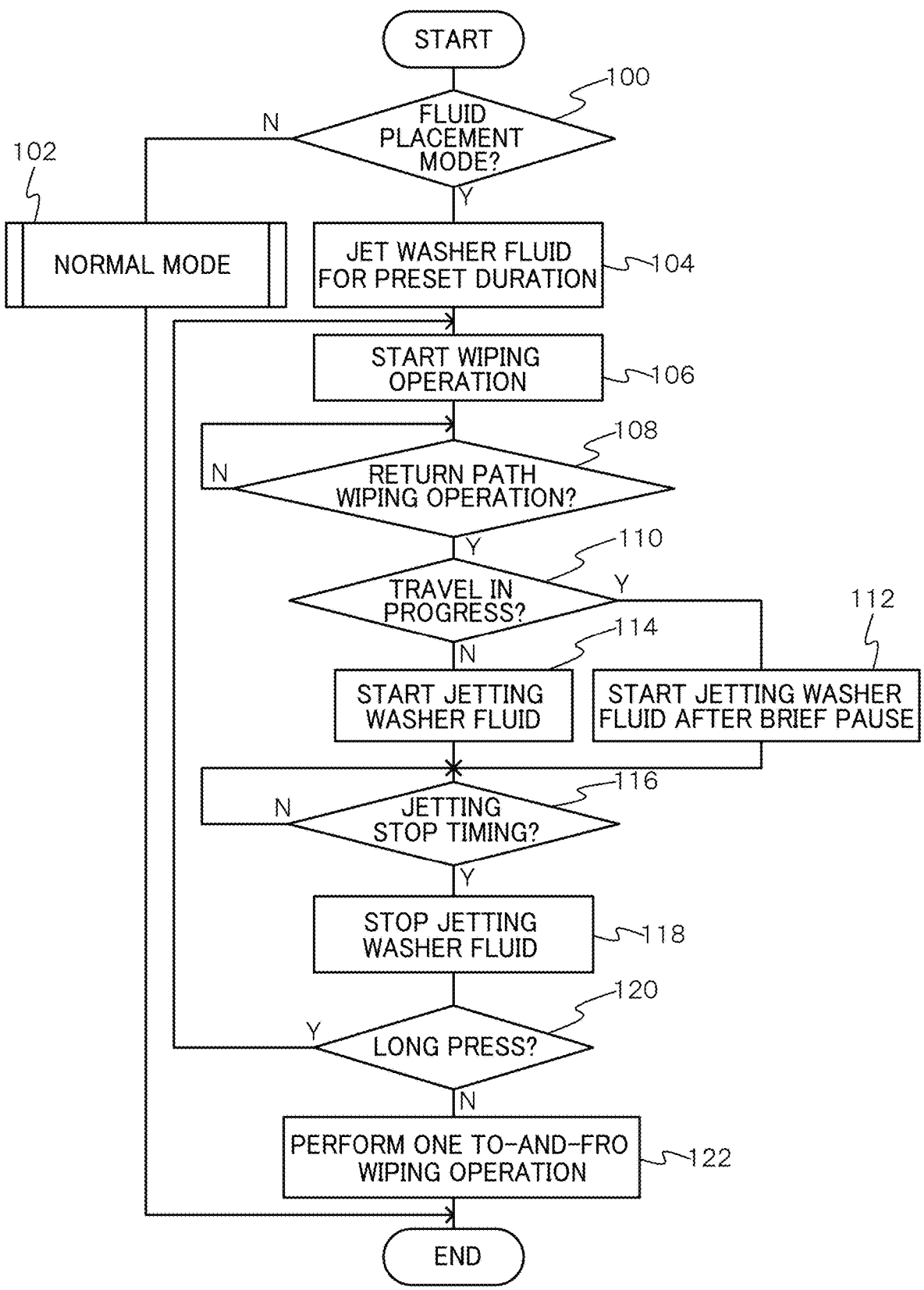

VEHICLE WIPER-WASHER DEVICE

TECHNICAL FIELD

The present disclosure relates to a vehicle wiper-washer device that jets washer fluid and that performs a wiping operation with a wiper blade.

BACKGROUND ART

Vehicle wiper devices that coordinate jetting of washer fluid with a wiping operation by a wiper blade are widely known.

In recent years, devices are becoming known in which nozzles for jetting washer fluid are provided to wiper arms or wiper blades to address issues relating to the jetting position of washer fluid, and issues relating to vehicle design, and so on (see, for example, Japanese Patent Application Laid-Open (JP-A) No. 2015-217842).

In the vehicle wiper device disclosed in JP-A No. 2015-217842, a main nozzle is provided at a leading end portion of a wiper arm, and a nozzle body portion of the main nozzle projects toward one width direction side of the wiper arm. A sloped face configuring an outer peripheral portion of the nozzle body portion is disposed at an arm base end side of a first main nozzle jetting hole of the nozzle body portion, and slopes toward the arm lower side on progression toward the arm base end side in side view. Thus, most of an airflow flowing alongside the wiper arm from the arm base end side toward the arm leading end side is guided by the sloped face, so as to flow along the sloped face toward the upper side of the nozzle body portion. The airflow is thereby suppressed from flowing between windshield glass and the nozzle body portion, enabling cleaning fluid jetted from the first main nozzle jetting hole to be suppressed from coming into contact with the airflow.

SUMMARY OF INVENTION

Technical Problem

However, in JP-A No. 2015-217842, although washer fluid can be jetted from the wiper arm, the washer fluid is wiped away before having a chance to act effectively on view-obstructing material such as dirt. There is therefore room for improvement in efficiently removing view-obstructing material such as dirt.

The present disclosure provides a vehicle wiper device in which washer fluid is capable of acting effectively when removing view-obstructing material such as dirt.

Solution to Problem

A first aspect of the present disclosure is a vehicle wiper device including: a wiper motor that causes to-and-fro wiping operation on a wiping surface by a wiper blade coupled to a wiper arm; a washer pump that feeds washer fluid under pressure to a jetting portion provided to at least one out of the wiper blade or the wiper arm, the washer pump causes washer fluid to be jetted from the jetting portion toward the wiping surface on an outward movement direction side of the wiper blade during the to-and-fro wiping operation; and a control unit that, in a case in which a predetermined signal has been detected, controls the wiper motor and the washer pump such that the to-and-fro wiping operation is performed, and such that washer fluid is jetted from the jetting portion toward the wiping surface on the outward movement direction side while a return path wiping operation of the to-and-fro wiping operation is being performed.

According to the vehicle wiper device of the first aspect, the wiper motor uses the wiper blade coupled to a leading end of the wiper arm to perform the wiping operation on the wiping surface.

The jetting portion is provided to at least one out of the wiper blade or the wiper arm. Washer fluid is fed under pressure to the jetting portion by the washer pump, such that the washer fluid is jetted from the jetting portion toward the wiping surface on the outward movement direction side of the wiper blade during the to-and-fro wiping operation.

Moreover, in a case in which the predetermined signal has been detected, the control unit controls the wiper motor and the washer pump such that the to-and-fro wiping operation is performed, and such that washer fluid is jetted from the jetting portion toward the wiping surface on the outward movement direction side while the return path wiping operation of the to-and-fro wiping operation is being performed. The return path wiping operation is thus performed while jetting washer fluid toward the opposite side to the movement direction of the wiper blade during the return path wiping operation. Accordingly, in the vehicle wiper device of the first aspect, the washer fluid is not wiped away immediately, allowing the washer fluid to act effectively when removing view-obstructing material such as dirt.

In a second aspect of the present disclosure, in the above aspect, the control unit may further control the wiper motor and the washer pump such that, after performing the to-and-fro wiping operation in which washer fluid is jetted from the jetting portion toward the wiping surface on the outward movement direction side while the return path wiping operation is being performed, jetting of washer fluid is stopped and the to-and-fro wiping operation is performed alone.

According to the vehicle wiper device of the second aspect, after performing the return path wiping operation while jetting washer fluid from the jetting portion toward the outward movement direction side, the to-and-fro wiping operation is performed alone, enabling the washer fluid remaining on the wiping surface to be wiped away, and enabling view-obstructing material such as dirt to be reliably removed.

In a third aspect of the present disclosure, in the above aspects, the control unit may further control the wiper motor and the washer pump such that, in a case in which a predetermined signal has been detected, the to-and-fro wiping operation starts after starting to jet a predetermined amount of washer fluid toward the outward movement direction side, and such that washer fluid is jetted toward the outward movement direction side while performing the return path wiping operation of the to-and-fro wiping operation.

According to the vehicle wiper device of the third aspect, washer fluid can be spread across the wiping surface while performing an outward path wiping operation.

In a fourth aspect of the present disclosure, in the above aspects, the predetermined signal may be a signal generated in at least one case out of a case in which a predetermined switch has been operated, or a case in which dirt has been detected by a detection section that detects the dirt on the wiping surface.

According to the vehicle wiper device of the fourth aspect, an operation to jet washer fluid toward the opposite side to the movement direction of the wiper blade during the return path wiping operation can be performed in response to dirt on the wiping surface.

In a fifth aspect of the present disclosure, in the above aspects, in a case in which travel is in progress, the control unit may further control the wiper motor and the washer pump such that a region where washer fluid is jetted on the outward movement direction side is limited to a predetermined region while the return path wiping operation is being performed.

The vehicle wiper device of the fifth aspect enables visibility to be secured while travel is in progress in a case in which the operation to jet washer fluid toward the opposite side to the movement direction of the wiper blade while performing the return path wiping operation is performed while travel is in progress.

In a sixth aspect of the present disclosure, in the third aspect, the control unit may control the washer pump such that a jetting amount of the predetermined amount of washer fluid jetted in a case in which the predetermined signal has been detected is a smaller amount of washer fluid jetted than a jetting amount of washer fluid first jetted in a case in which jetting of washer fluid has been instructed.

According to the vehicle wiper device of the sixth aspect, the jetting amount of washer fluid in an operation to jet washer fluid toward the opposite side to the movement direction of the wiper blade while performing the return path wiping operation can be suppressed from increasing.

In a seventh aspect of the present disclosure, in the above aspects, the control unit may control the wiper motor and the washer pump such that, in a case in which the predetermined signal is continuously detected for a predetermined duration or longer due to a predetermined switch being continuously operated for a predetermined duration or longer, the to-and-fro wiping operation is performed, and an operation to jet washer fluid from the jetting portion toward the wiping surface on the outward movement direction side is repeated while performing the return path wiping operation of the to-and-fro wiping operation.

According to the vehicle wiper device of the above configuration, in a case in which unsightly dirt is present on the wiping surface, for example, by operating the switch continuously for the predetermined duration or longer, the operation to jet washer fluid toward the opposite side to the movement direction of the wiper blade while performing the return path wiping operation is performed repeatedly, enabling view-obstructing material such as dirt to be reliably removed.

BRIEF DESCRIPTION OF DRAWINGS

FIG. 1 is a plan view viewed from the outside of a wiping surface, illustrating the entirety of a vehicle wiper device according to an exemplary embodiment.

FIG. 2 is a diagram to explain swinging of wiper arms and jetting of washer fluid.

FIG. 3 is a block diagram illustrating a configuration of a control device for controlling a vehicle wiper device according to the present exemplary embodiment.

FIG. 5 is a diagram illustrating examples of envisaged usage of jetting modes.

FIG. 6 is a timing chart illustrating specific examples of timings of washer fluid jetting and wiping operations, both in a normal mode and a fluid placement mode.

FIG. 7 is a flowchart illustrating an example of a flow of specific processing performed by a controller of a vehicle wiper device according to the present exemplary embodiment.

DESCRIPTION OF EMBODIMENTS

Figure 4A:
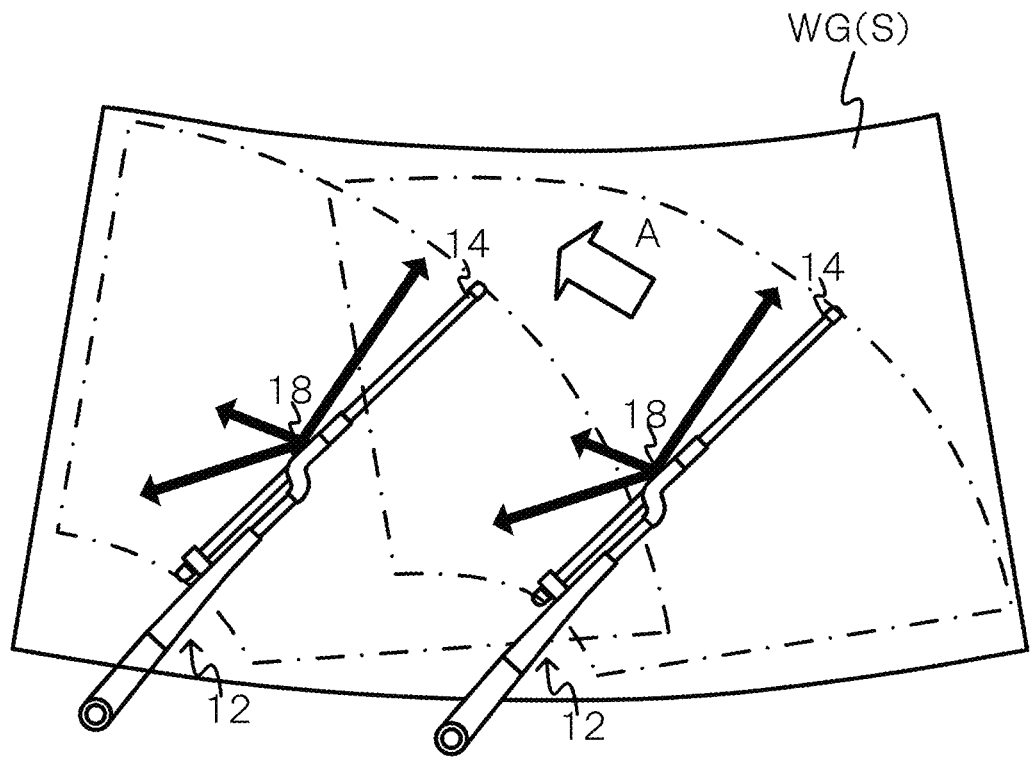
FIG. 4A is a diagram illustrating a situation in which washer fluid is jetted in an outward movement direction during a wiping operation in an outward movement direction.

Detailed explanation follows regarding an example of an exemplary embodiment, with reference to the drawings. FIG. 1 is a plan view viewed from the outside of a wiping surface, illustrating the entirety of a vehicle wiper device according to the present exemplary embodiment.

As illustrated in FIG. 1, a vehicle wiper device 10 is configured including substantially elongated shaped wiper arms 12, and wiper blades 14 that are coupled to leading ends of the respective wiper arms 12 and that wipe a windshield glass WG, serving as a wiping surface of a vehicle. The vehicle wiper device 10 also includes main nozzles 18, serving as jetting portions, provided in the vicinity of leading end portions of the wiper arms 12.

Each wiper arm 12 is configured including an arm head 12A, a retainer 12B, an arm piece 12C, and an arm-side coupling member 12D. The arm head 12A configures a base end portion of the wiper arm 12, the retainer 12B configures a length direction intermediate portion of the wiper arm 12, and the arm piece 12C and the arm-side coupling member 12D configure the leading end portion of the wiper arm 12.

The arm head 12A is formed in a substantially rectangular column shape, and is, for example, made of die-cast aluminum. A fixing portion 15 is formed at a base end portion of the arm head 12A. A leading end portion of a substantially circular column shaped pivot shaft 17 is fastened and fixed to the fixing portion 15. The pivot shaft 17 is supported so as to be capable of swinging by a pivot holder (not illustrated in the drawings) fixed to a frame of the vehicle or the like, and is coupled to a wiper motor (not illustrated in the drawings) through a link mechanism. The pivot shafts 17 are swung to-and-fro by drive force from the wiper motor, such that the respective wiper arms 12 are swung to-and-fro and the wiper blades 14 coupled to the leading ends of the wiper arms 12 are swung to-and-fro between a lower return position and an upper return position. Note that a stowed position is configured at a position further toward the arrow B direction side in FIG. 1 (the vehicle lower side) than the lower return position. The wiper blades 14 are hidden by an engine hood of the vehicle when in the stowed position. The wiper blades 14 may be moved to and stowed in the stowed position when a wiping operation has stopped. In such cases, a configuration is applied in which the wiper motor swings the wiper blades 14 to-and-fro by reversing its rotation at the upper return position and the lower return position, instead of continuously rotating in one direction. An electric motor including a control circuit that controls the revolution speed by pulse width modulation (PWM) control or the like may be applied as the wiper motor.

Note that the arrow A direction from the lower return position toward the upper return position in FIG. 1 is an outward swing direction of the wiper blades 14, and the arrow B direction from the upper return position toward the lower return position in FIG. 1 is a return swing direction of the wiper blades 14. Namely, the position where each wiper blade 14 switches from the outward path to the return path configures the upper return position, and the position where each wiper blade 14 switches from the return path to the outward path configures the lower return position.

Each of the wiper blades 14 is formed in a substantially elongated shape, and is disposed alongside the respective wiper arm 12 in its length direction. A length direction center portion of the wiper blade 14 is coupled to a leading end portion of the arm-side coupling member 12D of the corresponding wiper arm 12 through a coupling lever 19. Thus, as viewed along a direction orthogonal to a wiping surface S, each wiper blade 14 is disposed on the outward swing direction side with respect to the corresponding wiper arm 12 (portions of the wiper arm 12 excluding the arm-side coupling member 12D). Each wiper blade 14 performs a to-and-fro wiping operation due to the corresponding wiper arm 12 swinging to-and-fro.

Washer fluid is jetted from the main nozzles 18 provided to the wiper arms 12. The main nozzles 18 jet washer fluid toward the outward swing direction side of the respective wiper arms 12. The main nozzles 18 each include plural jetting holes, and washer fluid is jetted through these plural jetting holes. For example, the main nozzles 18 each include three jetting holes. As illustrated in FIG. 2, washer fluid may be jetted through these jetting holes in directions intersecting the swing directions of the wiper arms 12.

FIG. 3 is a block diagram illustrating configuration of a control device 50 that controls the vehicle wiper device 10 according to the present exemplary embodiment.

The control device 50 includes a wiper motor 32, a washer pump 34, and a controller 30 serving as a control unit.

The wiper motor 32 is driven to swing the wiper arms 12 to-and-fro. The washer pump 34 feeds washer fluid under pressure to the respective main nozzles 18, such that washer fluid is jetted through the respective jetting holes provided to the main nozzles 18. The wiper motor 32 and the washer pump 34 are each connected to the controller 30, and are driven under the control of the controller 30.

A washer switch 36, a wiper switch 38, a fluid placement mode switch 40, a vehicle electronic control unit (ECU) 42, and a dirt detection section 43, all of which are provided on the vehicle side, are also connected to the controller 30.

The washer switch 36 is a switch to instruct jetting of washer fluid. An operation result is input to the controller 30 when the washer switch 36 has been operated by an occupant.

In the present exemplary embodiment, when the washer switch 36 has been operated by the occupant so as to instruct the jetting of washer fluid, the operation result of the washer switch 36 is input to the controller 30. When the operation result of the washer switch 36 is input to the controller 30, based on the operation result of the washer switch 36 the controller 30 drives the washer pump 34 to jet a preset amount of washer fluid straight away, and then starts drive of the wiper motor 32. Namely, when the washer switch 36 has been operated, the controller 30 controls the wiper motor 32 and the washer pump 34 such that the jetting of washer fluid and a wiping operation using the wiper blades 14 are performed in coordination with each other.

The wiper switch 38 is a switch for instructing the start of a wiping operation by the wiper blades 14. An operation result is input to the controller 30 when the wiper switch 38 has been operated by the occupant. The wiper switch 38 is capable of instructing plural speeds for the speed of a wiping operation by the wiper blades 14. When the operation result of the wiper switch 38 is input to the controller 30, based on the operation result of the wiper switch 38 the controller 30 drives the wiper motor 32 at the instructed speed and starts a wiping operation by the wiper blades 14. Note that, in the example of the present exemplary embodiment, there are four wiping operation speeds of the wiper blades 14 when the wiper switch 38 has been operated, these being intermittent operation, low speed, medium speed, and high speed.

The fluid placement mode switch 40 is a switch for a state in which washer fluid remains on the windshield glass WG in order to remove view-obstructing material such as dirt that has adhered to the surface of the windshield glass WG and serves as view-obstructing material. Specifically, when the fluid placement mode switch 40 has been operated, washer fluid is jetted for a preset duration, and the wiper blades 14 perform a wiping operation. The washer pump 34 is driven such that washer fluid is jetted toward the outward movement direction side of the wiper blades 14 during a return movement direction wiping operation. The washer fluid is then wiped away by performing the wiping operation. Namely, washer fluid is jetted toward the opposite side to the movement direction of the wiper blades 14 during the return path wiping operation, and the washer fluid then remains (is laid down) on the windshield glass WG before being wiped away. In the present exemplary embodiment, the fluid placement mode switch 40 may be provided as a dedicated switch that is separate from the washer switch 36 and the wiper switch 38, in order to distinguish between the fluid placement instruction and the respective instructions for a wiping operation by the wiper blades 14 and jetting of washer fluid. An operation result is input to the controller 30 when the fluid placement mode switch 40 has been operated by the occupant. The controller 30 controls drive of the washer pump 34 and the wiper motor 32 based on the operation result of the fluid placement mode switch 40.

The vehicle ECU 42 is connected to the controller 30 in order to acquire various information regarding the vehicle. In the present exemplary embodiment, the controller 30 is capable of acquiring information for detecting whether the vehicle is stationary or traveling from the vehicle ECU 42. For example, the controller 30 acquires a detection result for a shift position of a vehicle transmission, a detection result for vehicle speed, a detection result for acceleration, and the like as information from the vehicle ECU 42. In the present exemplary embodiment, the controller 30 changes fluid placement regions in which fluid is laid down according to whether the vehicle is travelling or the vehicle is stationary. Specifically, the fluid placement region is limited in order to secure visibility while travel is in progress.

The dirt detection section 43 detects dirt on the windshield glass WG and outputs a detection result to the controller 30. For example, the dirt detection section 43 detects dirt on the windshield glass WG using an optical sensor, a camera, or the like. In a case in which dirt on the windshield glass WG has been detected by the dirt detection section 43, the controller 30 performs a similar operation to that cases in which the above-described fluid placement mode switch 40 has been operated. Note that the dirt detection section 43 may be omitted.

Detailed explanation follows regarding operation of the vehicle wiper device 10 in a case in which the fluid placement mode switch 40 has been operated or dirt on the windshield glass WG has been detected by the dirt detection section 43.

In the present exemplary embodiment, as illustrated in FIG. 4A, in a case in which the washer switch 36 has been operated, washer fluid is jetted toward the outward movement direction side during an outward movement direction wiping operation.

Figure 4B:
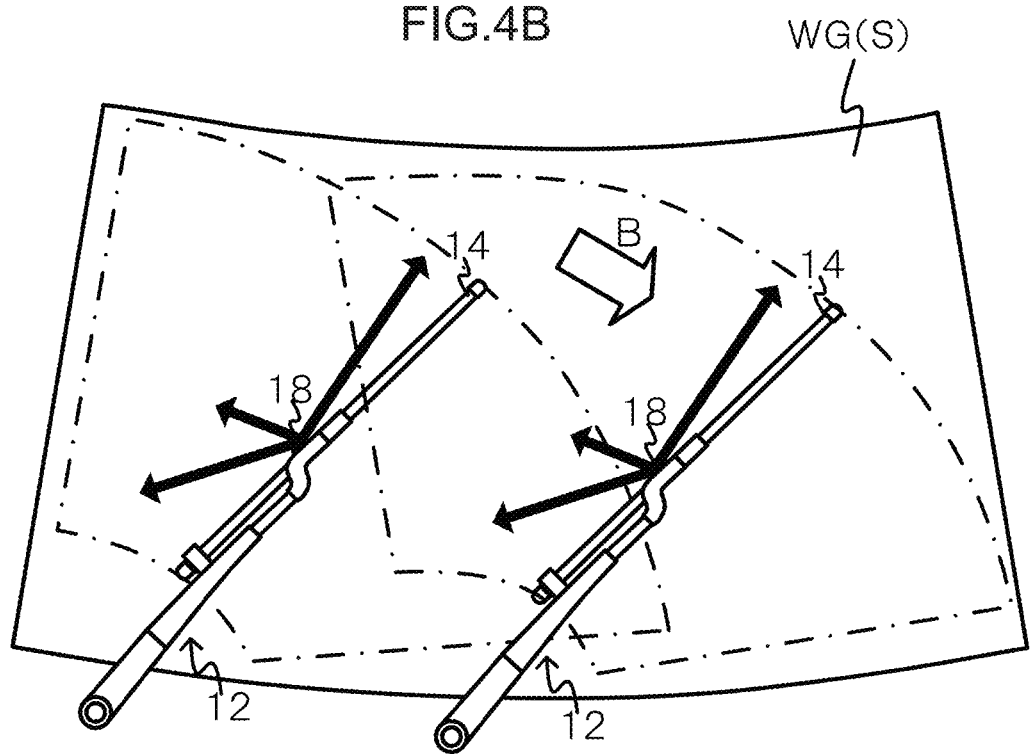
FIG. 4B is a diagram illustrating a situation in which washer fluid is jetted in an outward movement direction during a wiping operation in a return movement direction.

In contrast thereto, as illustrated in FIG. 4B, fluid is laid down in a case in which the fluid placement mode switch 40 has been operated, or dirt on the windshield glass WG has been detected by the dirt detection section 43. Namely, fluid is laid down by jetting washer fluid toward the outward movement direction side during a return movement direction wiping operation and is not immediately wiped away, allowing the washer fluid to act effectively on dirt before being wiped away.

In the present exemplary embodiment, as illustrated in FIG. 5, jetting modes include a normal jetting mode, corresponding to a case in which the washer switch 36 has been operated, and a fluid placement mode, corresponding to a case in which the fluid placement mode switch 40 has been operated. As examples of envisaged usage of each mode, the normal mode activated by operation of the washer switch 36 is envisaged for use on normal dirt, and the fluid placement mode is envisaged for use on stubborn dirt, frost, or the like. Conceivable examples of stubborn dirt include cases in which dirt is detected in a sensor area if the vehicle includes sensors or the like, and such dirt is removed using the fluid placement mode. Note that in the fluid placement mode of the present exemplary embodiment, the fluid placement area is limited so as to secure visibility if travel is in progress.

FIG. 6 is a timing chart illustrating specific examples of timings of washer fluid jetting and wiping operations, both in the normal mode and in the fluid placement mode.

As illustrated in FIG. 6, in the case of the normal mode performed in response to operation of the washer switch 36, first, jetting of washer fluid starts. A short press determination period is set in advance, such that in a case in which the operation of the washer switch 36 stops within the short press determination period, jetting of washer fluid is stopped and no further action is taken. In a case in which the washer switch 36 is operated continuously for the short press determination period or longer, washer fluid is jetted for a preset duration from the start of the operation, a wiping operation by the wiper arms 12 is started, and jetting of washer fluid stops after the wiping operation starts. The wiper arms 12 perform two to-and-fro wiping operations and then stop. Note that, in a case in which the washer switch 36 is operated for a longer duration than an AUTO operation determination period illustrated in FIG. 6 (in a case in which the washer switch 36 is operated until a timing corresponding to a long press (repeat) determination period), the above operation is repeated until operation of the washer switch 36 stops.

In the case of the fluid placement mode performed in response to operation of the fluid placement mode switch 40, washer fluid jetting starts similarly to in the normal mode, but the duration for which washer fluid is jetted is set so as to be shorter than in the normal mode (the jetting amount is less than in the normal mode). A wiping operation by the wiper arms 12 starts after the jetting of washer fluid has stopped. During the return movement direction wiping operation, washer fluid is then jetted such that the washer fluid is jetted toward the outward movement direction side, this being the opposite side to the movement direction of the wiper arms 12. The jetting of washer fluid is then stopped prior to the wiping operation reaching the lower return position (or at the lower return position), and the laid-down washer fluid is wiped away by one to-and-fro wiping operation. In the fluid placement mode, the washer fluid is jetted and laid down on the opposite side to the movement direction of the wiper arms, such that the washer fluid is not wiped away immediately, thereby allowing the washer fluid to permeate the dirt. The washer fluid is then wiped away after having permeated the dirt, enabling the dirt to be removed more reliably than in a case in which the washer fluid is wiped away immediately.

The jetting duration of washer fluid in the fluid placement mode, namely the sum of a jetting duration B and a jetting duration C illustrated in FIG. 6, is set to the same duration as a jetting duration A of washer fluid in the normal mode, thereby enabling an increase in the jetting amount of laid-down washer fluid to be suppressed.

Note that as illustrated by a dashed line in FIG. 6, in a case in which the fluid placement mode is activated while travel is in progress, after jetting the washer once, there is a brief pause before jetting again. This delays the timing at which fluid placement starts, thereby limiting the jetted area.

In FIG. 6, the timing at which washer fluid is first jetted in the fluid placement mode is set so as not to coincide with the timing at which the wiping operation starts. However, as illustrated by the dotted-dashed line in FIG. 6, the timings of the washer fluid jetting and the wiping operation may coincide with each other.

Explanation follows regarding specific processing performed by the controller 30 of the vehicle wiper device 10 according to the present exemplary embodiment configured as described above. FIG. 7 is a flowchart illustrating an example of a flow of specific processing performed by the controller 30 of the vehicle wiper device 10 according to the present exemplary embodiment. Note that the processing of FIG. 7 starts in a case in which jetting of washer fluid has been instructed using the washer switch 36, cases in which the fluid placement mode has been instructed using the fluid placement mode switch 40, and cases in which dirt on the windshield glass WG has been detected by the dirt detection section 43.

At step 100, the controller 30 determines whether or not the fluid placement mode has been instructed. Determination is negative in a case in which jetting of washer fluid has been instructed using the washer switch 36, and processing proceeds to step 102. On the other hand, determination is affirmative in a case in which the fluid placement mode has been instructed using the fluid placement mode switch 40, and cases in which dirt on the windshield glass WG has been detected by the dirt detection section 43, and processing proceeds to step 104.

At step 102, processing for the normal mode is performed by the controller 30, and the processing routine ends. As illustrated in FIG. 6, in the processing for the normal mode, the controller 30 controls the wiper motor 32 and the washer pump 34 such that a wiping operation is performed after jetting of washer fluid has started, followed by one more to-and-fro wiping operation to wipe away the washer fluid.

At step 104 onwards, the controller 30 controls the wiper motor 32 and the washer pump 34 so as to operate according to the fluid placement mode illustrated in FIG. 6.

Specifically, at step 104, the controller 30 controls the washer pump 34 so as to jet washer fluid for a preset duration, and processing proceeds to step 106.

At step 106, the controller 30 controls the wiper motor 32 so as to start a wiping operation, and processing proceeds to step 108.

At step 108, the controller 30 determines whether or not the wiping operation has switched to the return movement direction. This determination is made based on a detection result for a position of a rotation shaft within the wiper motor 32, for example. The controller 30 stands by until determination is affirmative, then processing proceeds to step 110.

At step 110, the controller 30 determines whether or not travel is in progress. Determination as to whether or not travel is in progress is made by acquiring various information (such as vehicle speed sensor information) from the vehicle ECU 42. In a case in which determination is affirmative, processing proceeds to step 112, and in a case in which determination is negative, processing proceeds to step 114.

At step 112, the controller 30 controls the washer pump 34 so as to pause briefly before starting washer fluid jetting, and processing proceeds to step 116. Namely, in cases in travel is in progress, washer fluid jetting starts after a brief pause, such that the fluid placement area on the outward path side during the return path wiping operation is limited to a lower region of the windshield glass WG.

At step 114, the controller 30 controls the washer pump 34 so as to start jetting washer fluid, and processing proceeds to step 116. Namely, jetting of washer fluid is started after the wiping operation has switched to the return movement direction, such that washer fluid is jetted and laid down on the opposite side to the movement direction of the wiper arms 12.

At step 116, the controller 30 determines whether or not the timing to stop jetting washer fluid has arrived. In the present exemplary embodiment, this determination is a determination as to whether or not a timing just before reaching the lower return position (or the timing on reaching the lower return position) has arrived, based on a detection result of the position of the rotation shaft within the wiper motor 32, for example. Processing stands by until the determination is affirmative, and then proceeds to step 118.

At step 118, the controller 30 controls the washer pump 34 so as to stop jetting washer fluid, and processing proceeds to step 120.

At step 120, the controller 30 determines whether or not a long press is being performed on the fluid placement mode switch 40. This determination is a determination as to whether or not the operation duration of the fluid placement mode switch 40 corresponds to a continuous operation duration of the predetermined AUTO operation determination period (FIG. 6) or longer that has reached a timing corresponding to the long press determination period. In a case in which determination is affirmative, processing returns to step 106 and the above-described processing is repeated, thereby repeating the operation of the fluid placement mode. In a case in which determination is negative, processing proceeds to step 122.

At step 122, the controller 30 performs a processing routine to control the wiper motor 32 to perform one to-and-fro wiping operation. Namely, the laid-down washer fluid is wiped away to complete the processing of the fluid placement mode. Dirt that has been signaled by the washer fluid as a result of the fluid placement can accordingly be wiped away.

Thus, in the present exemplary embodiment, in the fluid placement mode, washer fluid is jetted in the opposite direction to the movement direction of the wiper blades 14 during the return path wiping operation, such that the washer fluid is laid down on the windshield glass WG Accordingly, the jetted washer fluid is not immediately removed, thus enabling the washer fluid to act effectively on dirt or other view-obstructing materials. This may enable performance in removing view-obstructing materials such as dirt to be improved.

Figure 8:
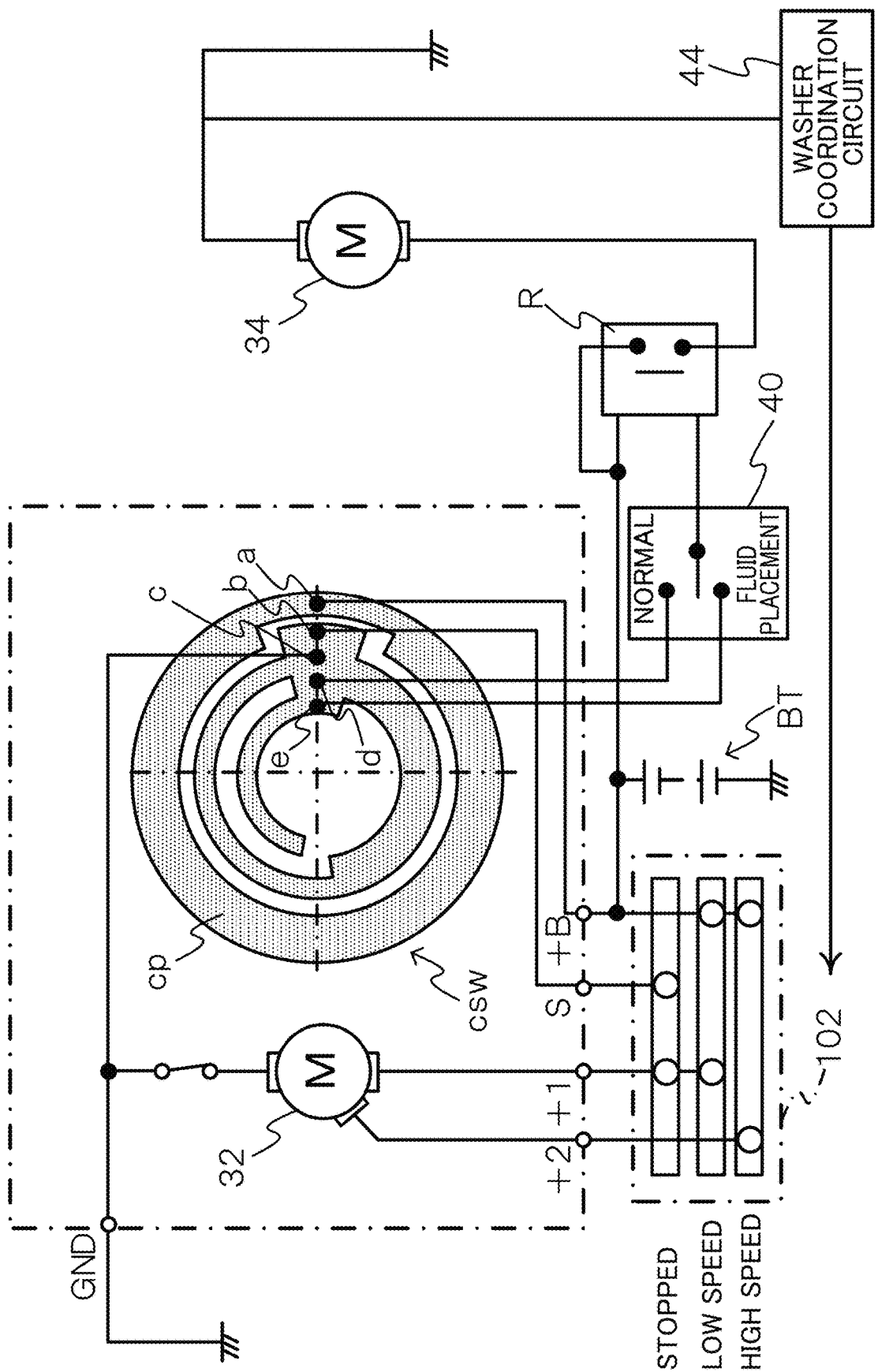
FIG. 8 is a diagram illustrating an example of a configuration in which a cam plate is employed to control jetting patterns in a normal mode and a fluid placement mode.

Although an example has been explained in the above exemplary embodiment in which jetting patterns in the normal mode and in the fluid placement mode are realized by the controller 30 executing the processing in FIG. 7, there is no limitation thereto. For example, instead of control by the controller 30, jetting patterns may be controlled in coordination with the wiper motor 32 using a cam plate provided to the wiper motor 32. Explanation follows regarding an example in which jetting patterns in the normal mode and in the fluid placement mode are controlled using a cam plate. FIG. 8 illustrates an example of a configuration in which jetting patterns in the normal mode and in the fluid placement mode are controlled using a cam plate.

As illustrated in FIG. 8, the wiper motor 32 is connected to a wiper switch 38. When the wiper switch 38 is switched ON, the wiper motor 32 is driven so as to swing the pivot shafts 17. The wiper switch 38 includes a +B terminal, an S terminal, a +1 terminal, and a +2 terminal. The +B terminal is connected to a positive electrode of a battery BT of the vehicle.

The wiper motor 32 includes a high speed brush, a low speed brush, and a common brush that is commonly employed at both low speed and high speed, in order to accommodate a high speed mode in which the vehicle wiper device 10 is operated at high speed, and a low speed mode in which the vehicle wiper device 10 is operated at low speed. A positive electrode terminal connected to the low speed brush of the wiper motor 32 is connected to the +1 terminal of the wiper switch 38, and a positive electrode terminal connected to the high speed brush of the wiper motor 32 is connected to the +2 terminal of the wiper switch 38. A negative electrode terminal connected to the common brush of the wiper motor 32 is earthed to GND.

A cam switch csw that corresponds to wiping positions of the wiper blades 14 is provided to the wiper motor 32. If the wiper switch 38 switched OFF in a state in which the respective wiper blades 14 are in a position other than a preset stationary position, the wiper blades 14 are returned and stopped at the stationary position by the cam switch csw.

The cam switch csw includes an a contact, a b contact, a c contact, a d contact, and an e contact, serving as fixed contacts disposed fixed, for example, to a housing cover configuring a gear housing of the wiper motor 32, and a cam plate cp serving as a movable contact disposed on a cam, described later, that is rotatably housed inside the gear housing. The a contact is connected to the +B terminal of the wiper switch 38, and the b contact is connected to the S terminal of the wiper switch 38. The c contact is connected to a negative electrode terminal of the wiper motor 32 and earthed to GND. The d contact and the e contact are connected via the fluid placement mode switch 40 to one end of a coil of a relay R that drives the washer pump 34.

The other end side of the coil of the relay R that drives the washer pump 34 is connected to the battery BT, one end side of a switch of the relay R is connected to the battery BT, and another end side of the relay R is connected to the washer pump 34. Namely, power is supplied to the washer pump 34 by the relay R being switched ON and OFF, and the modes are switched between the normal mode and the fluid placement mode using the fluid placement mode switch 40. A washer coordination circuit 44 is connected to the washer pump 34. When the washer switch 36 has been operated, the washer coordination circuit 44 controls the wiper motor 32 so as to coordinate rotation of the wiper motor 32 with the jetting of washer fluid.

The cam plate cp is provided to the cam that rotates integrally with a worm wheel (not illustrated in the drawings) coupled to an output shaft of the wiper motor 32. As the cam plate cp makes one revolution, the wiper blades 14 make one to-and-fro journey between the stationary position serving as the lower return position and the upper return position. Note that FIG. 8 illustrates a state in which the wiper blades 14 are disposed in the stationary position.

The respective contacts are provided at aligned positions on different sized concentric circles on the cam plate cp. The a contact, the b contact, the c contact, the d contact, and the e contact are provided in this sequence, at aligned positions starting from the outermost concentric circle. As the cam plate cp rotates, the b contact is connected to either one out of the a contact or the c contact through the cam plate cp. Specifically, the shape of the cam plate cp is set such that the b contact connects to the a contact when the wiper blades 14 are in a position other than the stationary position. Thus, current is supplied to the wiper motor 32 through the cam switch csw whenever the wiper blades 14 are in a position other than the stationary position, even if the wiper switch 38 is switched OFF. The shape of the contacts on the cam plate cp is also set such that the b contact connects to the c contact when the wiper blades 14 have swung to the stationary position. The low speed brush and the common brush of the wiper motor 32 accordingly become a closed circuit at GND potential so as to apply a brake (a brake on electrical generation by an armature of the wiper motor 32), and the wiper motor 32 is stopped corresponding to the stationary position.

The c contact is connected to the d contact and the e contact through the cam plate cp. Specifically, the shape of the cam plate cp is set such that the c contact, the d contact, and the e contact are all connected when the wiper blades 14 are in the stationary position. The shape of the cam plate cp is set such that the d contact and the c contact are connected at the timing when washer fluid is jetted during a wiping operation in the normal mode, and such that the d contact and the e contact are connected at the timing when washer fluid is jetted during a wiping operation in the fluid placement mode.

Figure 9:
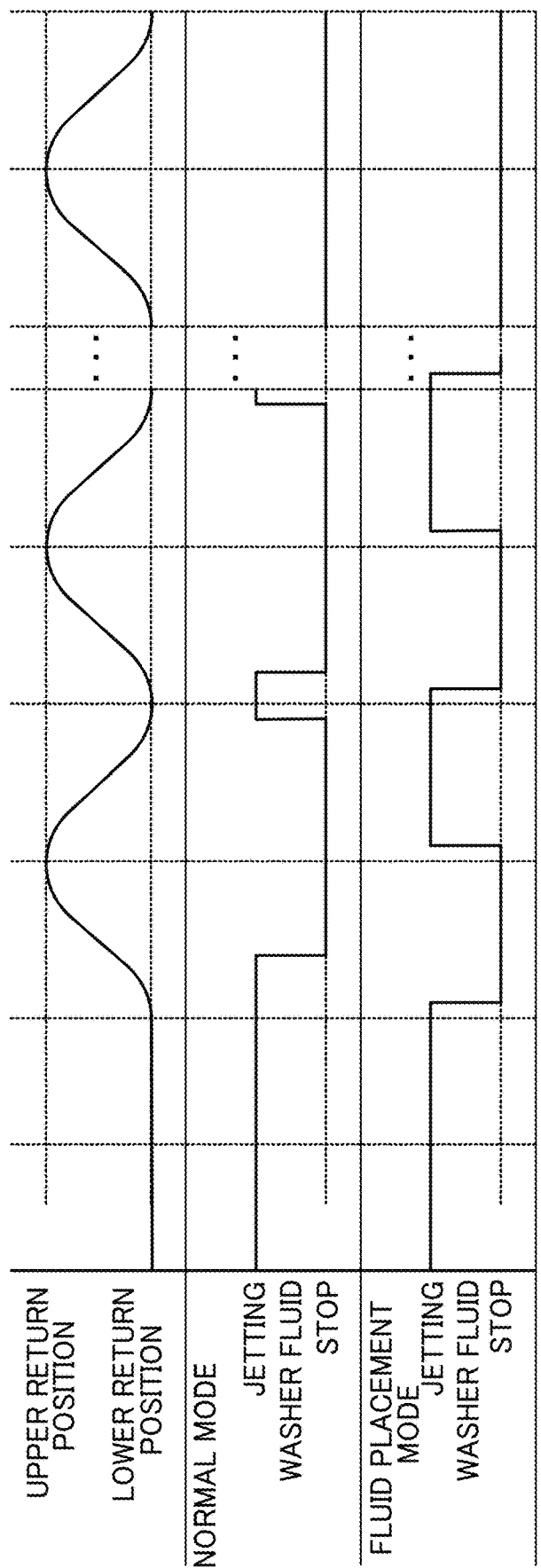
FIG. 9 is a timing chart illustrating specific examples of timings of washer fluid jetting and wiping operations, both in a normal mode and a fluid placement mode in a configuration employing a cam plate.

Thus, when the washer switch 36 is switched ON, the washer pump 34 is driven for a preset duration, after which the wiper motor 32 starts to be rotated by the washer coordination circuit 44, and the jetting of washer fluid and the wiping operations are performed as illustrated in FIG. 9. The modes are switched between the normal mode and the fluid placement mode by switching the relay R, and the timings at which washer fluid is jetted are varied according to the mode, such that washer fluid is jetted toward the opposite side to the movement direction of the wiper blades 14 performing the wiping operation in the fluid placement mode. Namely, the cam switch csw and the washer coordination circuit 44 function as a control unit in place of the controller 30 of the above exemplary embodiment.

In this manner, a stopping contact pattern used to stop the wiper blades 14 in the stationary position, and contact patterns used to jet washer fluid through the main nozzles 18, are provided on the same planar face of the same cam in the cam plate cp. When the cam plate cp is rotated in coordination with rotation of the wiper motor 32, the respective contacts of the cam switch csw make contact in order to stop the wiper blades 14 at the stationary position, and to control the timings at which the washer pump 34 is driven.

Note that although the main nozzles 18 are provided to the wiper arms 12 in the above exemplary embodiment, there is no limitation thereto. The main nozzles 18 may be provided to the wiper blades 14.

Although the main nozzles 18 each include three jetting holes in the above exemplary embodiment, there is no limitation thereto. For example, the nozzles may each include one, two, or four or more, jetting holes.

Although one exemplary embodiment has been explained above, the present disclosure is not limited to the above configuration, and obviously various other modifications may be implemented within a range not departing from the spirit of the present disclosure.

The disclosure of Japanese Patent Application No. 2016-142307 is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A vehicle wiper-washer device comprising:
    a wiper blade coupled to a wiper arm, the wiper blade moving with the wiper arm between a lower return position and an upper return position during a to-and-fro wiping operation on a wiping surface by the wiper blade;
    a jetting portion provided to at least one out of the wiper blade and the wiper arm, the jetting portion jetting a washer fluid from a side of the wiper blade and the wiper arm that faces toward the upper return position,
    a wiper motor that causes the to-and-fro wiping operation on the wiping surface by the wiper blade coupled to the wiper arm;
    a washer pump that feeds the washer fluid under pressure to the jetting portion to cause the washer fluid to be jetted from the jetting portion; and
    a control unit that, in a case in which a predetermined signal has been detected, controls the wiper motor and the washer pump such that the to-and-fro wiping operation is performed, and such that washer fluid is jetted from the jetting portion toward the wiping surface from the side of the wiper blade and the wiper arm that faces toward the upper return position while a return path wiping operation of the to-and-fro wiping operation is being performed in which the wiper motor moves the wiper blade coupled to the wiper arm toward the lower return position, so that the washer fluid is jetted from the jetting portion in an opposite direction from a moving direction of the wiper blade and the wiper arm.

2. The vehicle wiper-washer device of claim 1, wherein the control unit further controls the wiper motor and the washer pump such that, after performing the to-and-fro wiping operation in which the washer fluid is jetted from the jetting portion toward the wiping surface from the side of the wiper blade and the wiper arm that faces toward the upper return position while the return path wiping operation is being performed, jetting of the washer fluid is stopped and the to-and-fro wiping operation is performed alone.

3. The vehicle wiper-washer device of claim 1, wherein the control unit further controls the wiper motor and the washer pump such that, in the case in which the predetermined signal has been detected, the to-and-fro wiping operation starts after starting to jet a predetermined amount of the washer fluid toward the side of the wiper blade and the wiper arm that faces toward the upper return position, and such that the washer fluid is jetted toward the side of the wiper blade and the wiper arm that faces toward the upper return position while performing the return path wiping operation of the to-and-fro wiping operation.

4. The vehicle wiper-washer device of claim 3, wherein the control unit controls the washer pump such that a jetting amount of the predetermined amount of the washer fluid jetted in the case in which the predetermined signal has been detected is a smaller amount of the washer fluid jetted than a jetting amount of the washer fluid first jetted in a case in which jetting of the washer fluid has been instructed.

5. The vehicle wiper-washer device of claim 1, wherein the predetermined signal is a signal generated in at least one case out of a case in which a predetermined switch has been operated, and a case in which dirt has been detected by a detection section that detects the dirt on the wiping surface.

6. The vehicle wiper-washer device of claim 1, wherein, in a case in which travel of a vehicle having the vehicle wiper-washer device is in progress, the control unit further controls the wiper motor and the washer pump such that a region where the washer fluid is jetted on the side of the wiper blade and the wiper arm that faces toward the upper return position is limited to a predetermined region while the return path wiping operation is being performed.

7. The vehicle wiper-washer device of claim 1, wherein the control unit controls the wiper motor and the washer pump such that, in a case in which the predetermined signal is continuously detected for a predetermined duration or longer due to a predetermined switch being continuously operated for a predetermined duration or longer, the to-and-fro wiping operation is performed, and an operation to jet the washer fluid from the jetting portion toward the wiping surface from the side of the wiper blade and the wiper arm that faces toward the upper return position is repeated while performing the return path wiping operation of the to-and-fro wiping operation.

\* \* \* \* \*